(12) United States Patent
Burson

(10) Patent No.: US 6,453,221 B2
(45) Date of Patent: Sep. 17, 2002

(54) METHOD FOR DETERMINING A MINIMUM CONTROL SPEED FOR AN AIRCRAFT

(75) Inventor: David Burson, Toulouse (FR)

(73) Assignee: Eads Airbus SA, Paris (FR)

( * ) Notice: Subject to any disclaimer, the term of this patent is extended or adjusted under 35 U.S.C. 154(b) by 0 days.

(21) Appl. No.: 09/814,172

(22) Filed: Mar. 22, 2001

(30) Foreign Application Priority Data

Mar. 23, 2000 (FR) .............................................. 00 03719

(51) Int. Cl.[7] .......................... G05B 9/03; G05B 15/02; G05D 1/00
(52) U.S. Cl. ......................... 701/3; 340/945; 244/75 R; 244/53 R
(58) Field of Search ................... 701/3, 7, 1; 244/75 R, 244/76 R, 53 R, 55, 195; 340/945

(56) References Cited

U.S. PATENT DOCUMENTS

| | | | |
|---|---|---|---|
| 4,638,437 A | | 1/1987 | Cleary et al. |
| 4,964,599 A | * | 10/1990 | Farineau .................... 244/195 |
| 5,927,655 A | | 7/1999 | Larramendy et al. |
| 6,241,183 B1 | * | 6/2001 | Mathieu ................... 244/75 R |

OTHER PUBLICATIONS

Latimer, K. et al., "C–17 Engine–Out Compensation System Testing." 1999 IEEE Aerospace Conference. vol. 3, Mar. 6–13, 1999, pp. 43–51.

* cited by examiner

Primary Examiner—William A. Cuchlinski, Jr.
Assistant Examiner—Olga Hernandez
(74) Attorney, Agent, or Firm—Stevens, Davis, Miller & Mosher, LLP

(57) ABSTRACT

A method for determining a minimum control speed for an aircraft includes measuring, during at least one flight of the aircraft, the values of predefined parameters, recording these values in a memory, and determining, on the basis of these measurements and of at least one predefined certification value received from memory, a certification value (Cnfcertif) for the yaw moment (Cnf) created by the shutting down of one engine of the aircraft. The certification value (Cnfcertif) is used to determine the minimum control speed. On the basis of measured values of the sideslip ($\beta$), the lateral force (Cy), and a certification value (Cycertif), a certification value ($\beta$certif) is determined, and, on the basis of the measured value of the sideslip ($\beta$), the lateral force (Cy), the yaw moment (Cnf), and the certification values (Cycertif) and ($\beta$certif), the certification value (Cnfcertif) is determined.

4 Claims, 2 Drawing Sheets

METHOD FOR DETERMINING A MINIMUM CONTROL SPEED FOR AN AIRCRAFT

Figure 1:
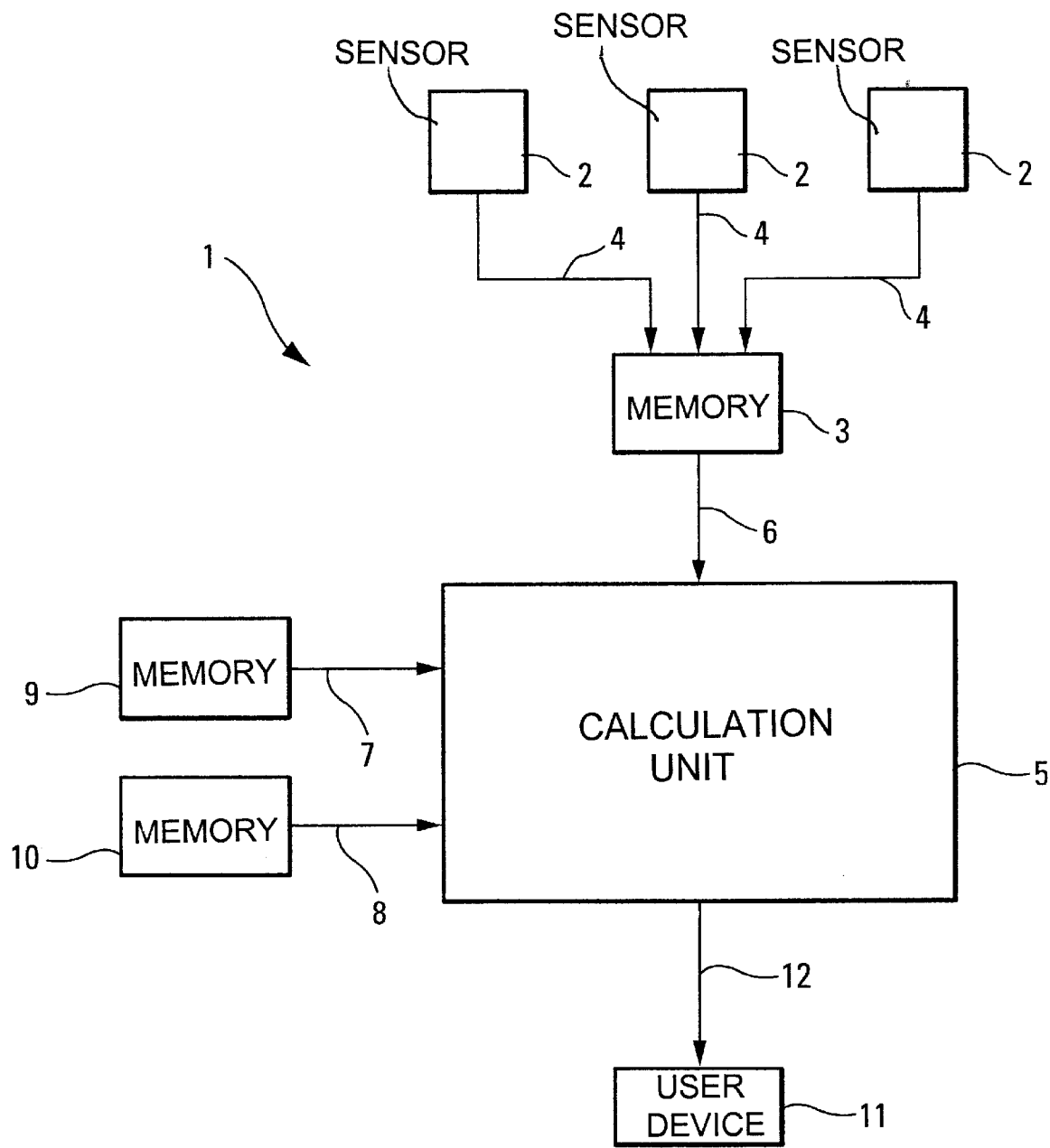

The present invention relates to a method for determining, on an aircraft equipped with a number of engines, a minimum control speed when at least one engine is shut down.

In the context of the present invention, the expression minimum control speed is to be understood as meaning the minimum speed at which it is possible to hold the aircraft, for example a civilian transport airplane, on a constant heading with, simultaneously:

- at least one engine shut down, for example an engine which has failed or an engine which has been deliberately shut down;
- the rudder hard over; and
- a lateral inclination of the aircraft less than or equal to 5°.

It is known that minimum control speeds VMC may impose on the aircraft limits particularly on the permissible characteristic speeds on take-off and therefore on the performance of said aircraft. This is because, for safety reasons, it is necessary in particular:

- for the rotational speed Vr on take-off to be greater than or equal to 1.05 VMCA, the speed VMCA being the minimum control speed on take-off;
- for the minimum speed V2 at the second segment to be greater than or equal to 1.1 VMCA; and
- for the minimum speed Vref on approach to be greater than or equal to VMCL, the speed VMCL being the minimum control speed on approach.

Of course, a minimum control speed is a characteristic of the type of aircraft considered. In consequence, to guarantee the required level of safety, without in any way being penalized by adopting excessively large margins with respect to its actual value, it is necessary to determine this minimum control speed as accurately as possible.

A method for determining, on an aircraft equipped with a number of engines, the minimum control speed with at least one engine shut down is known. According to that known method:

a) during a number of flights (known as test flights) of said aircraft, the values of predefined parameters are measured on said aircraft;

b) on the basis of said measurements and of at least one predefined certification value, a certification value Cnfcertif for the yaw moment cnf created by the shutting down of the engine is determined;

c) on the basis of said certification value Cnfcertif, the value of a parameter K is calculated to allow the forming of a first relationship $$\Delta fn = K \cdot Vc^2,$$

in which:
- $\Delta fn$ illustrates the asymmetry of thrust due to the shutting down of the engine; and
- Vc represents the speed of the aircraft; and d) on the basis of said relationship and of engine thrust curves, said minimum control speed is determined.

In addition, according to this known method, in order to make the measurements on the aircraft, the rudder is brought hard over. As the value of the angle of turn δn of the rudder is then known, the aforementioned step b) is carried out, resolving a linear model of the behavior of the aircraft.

In order to do this, there are two different known models which can be written, respectively:

$$* \quad \frac{Ny \cdot Cz}{\delta n} = A \cdot \frac{Cnf}{\delta n} + B$$

$$* \quad \sin\Phi \cdot Cz = A \cdot Cnf + B$$

In these models:
- Ny is the lateral acceleration;
- Cz is the coefficient of lift;
- Cnf is the yaw moment created by the shutting down of the engine;
- Φ is the roll angle; and
- A and B are two coefficient determined by means of a straight line in linear regression over the measured values.

This known method presents several drawbacks. In particular:
- it is not very accurate;
- because of the spread on the measurements and of the difficulty of obtaining perfectly stabilized points, the quality of said linear regression is low. Also, a number of test flights are needed in order to obtain from the measurements taken, a sufficiency of points to allow an appropriate selection of said points, this being with a view to obtaining sufficient quality for the linear regression; and
- the reliability of this known method is low. Specifically, because of the low quality of the linear regression, different minimum control speeds are sometimes obtained for one and the same aircraft each time said known method is carried out.

An object of the present invention is to overcome these drawbacks. The invention relates to a reliable and effective method for determining, on an aircraft equipped with a number of engines, the minimum control speed with at least one engine shut down, either deliberately by a pilot or as the result of a failure.

To this end, said method whereby:

a) during at least one flight of said aircraft, the values of predefined parameters are measured on said aircraft;

b) on the basis of said measurements and of at least one predefined certification value, a certification value Cnfcertif for the yaw moment cnf created by the shutting down of the engine is determined;

c) on the basis of said certification value Cnfcertif, the value of a parameter K is calculated to allow the forming of a first relationship:

$$\Delta fn = K \cdot Vc^2,$$

in which:
- $\Delta fn$ illustrates the asymmetry of thrust due to the shutting down of the engine; and
- Vc represents the speed of the aircraft; and d) on the basis of said first relationship and of engine thrust curves, said minimum control speed is determined, is noteworthy, according to the invention, in that, in said step b):

b1) on the basis of simultaneously measured values of, respectively, the sideslip β and the lateral force Cy, a second relationship between said sideslip β and said lateral force Cy is deduced;

b2) on the basis of said second relationship and of a certification value Cycertif of said lateral force Cy, a corresponding certification value βcertif is determined for the sideslip β;

b3) on the basis of the simultaneously measured values of, respectively, said sideslip β, said lateral force Cy and said yaw moment Cnf, a third relationship between said sideslip β, said lateral force Cy and said yaw moment Cnf is deduced; and b4) on the basis of said third relationship and of said certification values Cycertif and βcertif, said certification value Cnfcertif is determined.

Thus, by virtue of the invention, said method is particularly effective and reliable. Indeed, when said second and/or third relationships are advantageously obtained by means of linear regressions over the measurements made on the aircraft, in particular:

said linear regressions are of much better quality than those of the aforementioned known method, with the same measurements (test points);

said regression straight lines are independent of the thrust level of the aircraft and are less sensitive to the dynamics or to less rigorous selection of the test points.

It will be noted that the aforementioned advantages of the method according to the invention over the customary procedures are due to better modeling of the behavior of the aircraft (introduction of sideslip, elimination of the turn angle δn). Schematically speaking, it may be said that with the old methods, the cluster of test points was considered from the worst possible viewpoint (Cy/Cnf) from the point of view of modeling, whereas with the method according to the invention, the plane in which this cluster is located is identified and projected onto a plane (Cy/β) in which the cluster appears in a very stretched-out form, which is favorable to linear regressions. Because of the better modeling, the spread on the measurement is reduced.

In consequence, by virtue of the invention:

it is possible to improve safety during test flights, that is to say during flights carried out in the aforementioned step a) because, as the curves of test points no longer depend on the asymmetry of the thrust, said test flights can be carried out, not with an engine shut down, but now simply with one engine at idle;

the number of test flights can be reduced, because of the following characteristics: better use of the test points, broader selection, independence of the configuration, of the level of thrust and of the mass, which means that it is not necessary to repeat the test flights for different configurations and thrust levels;

the time spent implementing the method can be reduced because the quality of the linear regressions makes it possible to eliminate the numerous looping cycles and lengthy selection processes which exist with the known method; and because of the increased reliability of the method according to the invention, the risk of penalties likely to be imposed by the official services for underestimating the minimum control speed is reduced.

Moreover, advantageously:

said second relationship between the lateral force Cy and the sideslip β can be written:

$$Cy = Cy\beta \cdot \beta + C,$$

in which Cyβ and C are coefficients determined in step b1) on the basis of measurements made on the aircraft; and/or said third relationship between the lateral force Cy, the sideslip β and the yaw moment Cnf can be written:

$$Cy = A \cdot Cnf + B \cdot \beta,$$

in which A and B are coefficients determined in step b3) on the basis of measurements made on the aircraft.

Furthermore, advantageously, in step c), the parameter K is calculated from the relationship:

$$K = \frac{\rho o \cdot S \cdot L}{2 \cdot y} \cdot cnfcertif,$$

in which:

ρo is the density of air at 0 feet in standard atmosphere;

S is the reference area of the wing structure;

L is the mean aerodynamic chord; and y is the lever arm of the engine.

The figures of the appended drawing will make it easy to understand how the invention may be achieved. In these figures, identical references denote similar elements.

FIG. 1 diagrammatically shows a device for implementing the method according to the invention.

Figure 2:
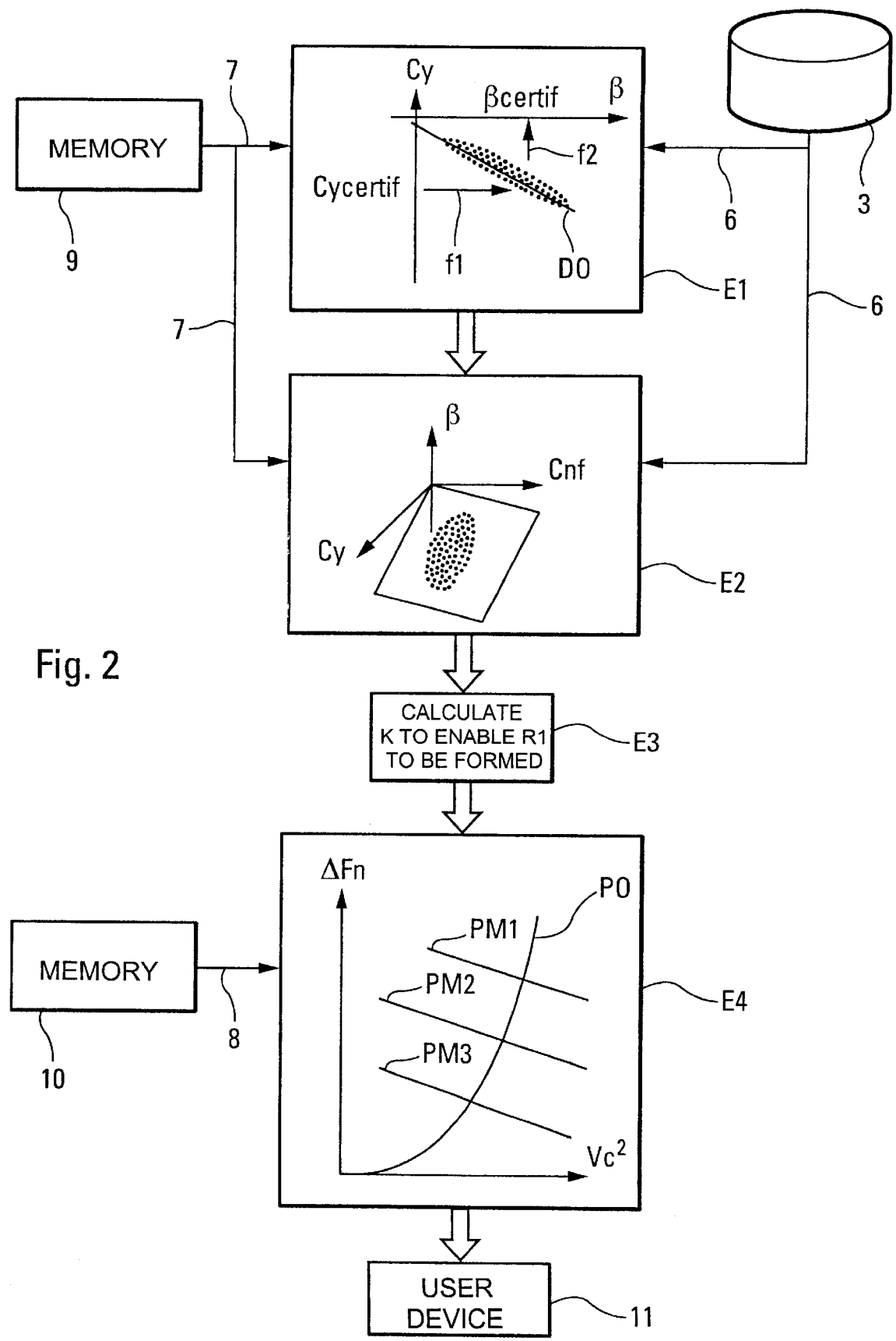

FIG. 2 illustrates a block diagram of the method according to the invention.

The device 1 according to the invention and depicted diagrammatically in FIG. 1 is intended to determine, on an aircraft, particularly a civilian transport airplane, not depicted and equipped with a number of engines, a minimum control speed VMC with at least one engine shut down (either deliberately or following a failure).

To this end, said device 1 comprises:

a number of sensors 2 of the usual type, on board said aircraft and intended to measure the values of the parameters specified hereinbelow during at least one flight (known as a test flight) of said aircraft;

at least one memory 3 which is also on board the aircraft, which is connected by links 4 to said sensors 2 and which is intended to record the values measured by said sensors 2; and a calculation unit 5 which is connected by links 6 to 8 to said memory 2 and to memories 9 and 10, respectively, and which determines said speed VMC in the way described hereinbelow on the basis of the measurements recorded in the memory 3, and of certification values and thrust curves PM1, PM2, PM3 for the engines, these values being as specified hereinbelow and recorded in said memories 9 and 10, respectively. The calculation unit 5 which is either on board or installed on the ground, is able to transmit the calculated speed VMC to a user device 11, particularly a storage unit, via a link 12.

The method implemented by this device 1 has, in addition to a preliminary step during which, in the course of at least one test flight, the values of parameters are measured on the aircraft and recorded in the memory 3, steps E1 to E4 depicted in FIG. 2, in which:

I) in steps E1 and E2, on the basis of said measurements received from the memory 3 and of the predefined certification value received from the memory 9, a certification value Cnfcertif of the yaw moment cnf created by the shutting down of the engine is determined;

II) in step E3, on the basis of said value Cnfcertif, the value of a parameter K is calculated to enable a first relationship R'to be formed:

$$\Delta fn = K \cdot Vc^2,$$

in which:
Δfn illustrates the asymmetry of thrust due to the shutting down of the engine; and
Vc represents the speed of the aircraft; and III) in step E4, on the basis of said first relationship represented by a curve P0 in FIG. 2 and engine thrust curves PM1, PM2, PM3, said minimum control speed VMC is determined in the usual way. To do that, said thrust curves, of the usual type, which are recorded in the memory 10, are generally provided by the engine manufacturer.

According to the invention, in said step E1:

first of all, on the basis of the simultaneously measured values of, respectively, the slipslip β and the lateral force Cy, which values are received from the memory 3, there is deduced a second relationship R2, specified hereinbelow, between said sideslip β and said lateral force Cy. To do this, the usual linear regression over the measurement points is used to determine a regression straight line DO between the sideslip β and the lateral force Cy; and secondly, on the basis of said second relationship R'and therefore of the regression straight line DO, and of a certification value Cycertif of said lateral force Cy received from the memory 9, a corresponding certification value βcertif is determined for the sideslip β, as illustrated by arrows f1 and f2 in FIG. 2.

In addition, according to the invention, in said step E2:

first of all, on the basis of simultaneously measured values of, respectively, said sideslip β, said lateral force Cy and said yaw moment Cnf, which values are received from the memory 3, there is deduced a third relationship R'between said sideslip β, said lateral force Cy and said yaw moment Cnf. The usual linear regression is used to do this; and secondly, on the basis of said third relationship R'and of said certification values Cycertif and βcertif, said certification value Cnfcertif used in the aforementioned step E3 is determined.

Thus, by virtue of the invention, said method and said device 1 are particularly effective and reliable.

In addition, by virtue of the invention:

the aforementioned linear regressions are of much better quality than those of the known method indicated previously, with the same measurements or test points;

the regression straight lines obtained by said linear regressions according to the invention are independent of the configuration of the aircraft (flaps, landing gear); and in addition said regression straight lines are independent of the level of thrust of the aircraft and less sensitive to the dynamics or to less rigorous selection of the test points.

In consequence, by virtue of the invention:

it is possible to improve safety during test flights, that is to say during the flights implementing the aforementioned preliminary step because, as the curves of test points no longer depend on the asymmetry of the thrust, said test flights can be performed, not with an engine shut down, but now simply with an engine at idle;

the number of test flights can be reduced because of the following characteristics: better use of the test points, broader selection, independence of the configuration, of the level of thrust and of the mass so that it is not necessary to repeat the test flights for different configurations and thrust levels;

the time spent implementing the method can be reduced because the quality of the linear regressions makes it possible to eliminate the numerous looping cycles and lengthy selection processes which exist in the known method; and because of the improved reliability of the method according to the invention, the risk of penalties likely to be imposed by the official services for underestimating the minimum control speed is reduced.

Furthermore, according to the invention:

said second relationship R'between the lateral force Cy and the sideslip β can be written:

$$Cy = Cy\beta \cdot \beta + C,$$

in which Cyβ and C are coefficients determined in step E1 on the basis of measurements made on the aircraft, by means of the aforementioned linear regression;

said third relationship R'between the lateral force Cy, the sideslip β and the yaw moment Cnf, can be written:

$$Cy = A \cdot Cnf + B \cdot \beta,$$

in which A and B are coefficients determined in step E2 on the basis of measurements made on the aircraft, using the aforementioned linear regression; and in step E3, regarding said first relationship R1, the parameter K is calculated from the expression:

$$K = \frac{\rho o \cdot S \cdot L}{2 \cdot y} \cdot cnfcertif$$

in which:
ρo is the density of air at 0 feet in standard atmosphere;
S is the reference area of the wing structure;
L is the mean aerodynamic chord; and
y is the lever arm of the engine.

The aforementioned relationships R1, R'and R'according to the invention will be demonstrated hereinbelow.

To do this, use will be made of the following parameters:
Vs1g: stall speed at 1 g
KVs1g: ratio between Vs1g and the minimum control speed VMC (determined by regulations)
Ny: lateral acceleration
ΔFn: asymmetry of thrust
β: sideslip angle
Φ: roll angle
Vc: aircraft speed
δl: turn angle of the warping command
δn: turn angle of the rudder
ρo: density of air at 0 feed in a standard atmosphere
m: mass of the aircraft
g: acceleration due to gravity
S: reference area of the wing structure
y: engine lever arm (that is to say the distance between the axis of thrust of the engine and the plane of symmetry of the aircraft)
L: reference length (namely the mean aerodynamic chord)
Cz: coefficient of lift
Cnf: yaw moment created by the shutting down of the engine
Cyβ: the derivative of the coefficient of lateral force with respect to β

$Cy\delta n$: the derivative of the coefficient of lateral force with respect to $\delta n$ $Cy\delta l$: the derivative of the coefficient of lateral force with respect to $\delta l$ $Cl\beta$: the derivative of the coefficient of roll moment with respect to $\beta$ $Cl\delta n$: the derivative of the coefficient of roll moment with respect to $\delta n$ $Cl\delta l$: the derivative of the coefficient of roll moment with respect to $\delta l$ $Cn\beta$: the derivative of the coefficient of yaw moment with respect to $\beta$ $Cn\delta n$: the derivative of the coefficient of yaw moment with respect to $\delta n$ $Cn\delta l$: the derivative of the coefficient of yaw moment with respect to $\delta l$.

First of all, regarding relationship R', it will be demonstrated that $$Cy = A.Cnf + B.\beta$$

with $$\begin{cases} Cy = \dfrac{2 \cdot m \cdot g \cdot Ny}{\rho o \cdot S \cdot Vc^2} \\ Cnf = \dfrac{2 \cdot \Delta Fn \cdot y}{\rho o \cdot S \cdot L \cdot Vc^2} \end{cases}$$

To this end, from the following equations:

lateral force:

$$\frac{1}{2} \cdot \rho o \cdot S \cdot Vc^2 (Cy\beta \cdot \beta + Cy\delta n \cdot \delta n + Cy\delta l \cdot \delta l) + m \cdot g \cdot Ny = 0;$$

the roll moment:

$$Cl\beta \cdot \beta + Cl\delta n \cdot \delta n + Cl\delta l \cdot \delta l = 0;\ \text{and}$$

the yaw moment:

$$\frac{1}{2} \cdot \rho o \cdot S \cdot L \cdot Vc^2 (Cn\beta \cdot \beta + Cn\delta n \cdot \delta n + Cn\delta l \cdot \delta l) = \Delta Fn \cdot y,$$

the following system is obtained:

$$\begin{pmatrix} Cy\beta & Cy\delta n & Cy\delta l \\ Cl\beta & Cl\delta n & Cl\delta l \\ Cn\beta & Cn\delta n & Cn\delta l \end{pmatrix} * \begin{pmatrix} \beta \\ \delta n \\ \delta l \end{pmatrix} = \begin{pmatrix} -\dfrac{2 \cdot m \cdot g \cdot Ny}{\rho o \cdot S \cdot Vc^2} \\ 0 \\ \dfrac{2 \cdot \Delta Fn \cdot y}{\rho o \cdot S \cdot L \cdot Vc^2} \end{pmatrix} = \begin{pmatrix} Cy \\ O \\ Cnf \end{pmatrix}$$

This system of three equations with three unknowns is solved using Cramer's rule. The determinant of said system can be written:

$$\Delta = \begin{vmatrix} Cy\beta & Cy\delta n & Cy\delta l \\ Cl\beta & Cl\delta n & Cl\delta l \\ Cn\beta & Cn\delta n & Cn\delta l \end{vmatrix} \neq 0$$

The reduced determinant can be written:

$$\beta = \frac{1}{\Delta} * \begin{vmatrix} -Ny \cdot Cz & Cy\delta n & Cy\delta l \\ 0 & Cl\delta n & Cl\delta l \\ Cnf & Cn\delta n & Cn\delta l \end{vmatrix}$$

namely $$\Delta \cdot \beta = -Ny \cdot Cz \cdot (Cl\delta n \cdot Cn\delta l - Cl\delta l \cdot Cn\delta n) + \qquad (a)$$
$$Cnf \cdot (Cy\delta n \cdot Cl\delta l - Cy\delta l \cdot Cl\delta n)$$
$$\frac{Ny \cdot Cz}{\beta} = \frac{Cnf}{\beta} \cdot \left( \frac{(Cy\delta l \cdot Cl\delta n - Cy\delta n \cdot Cl\delta l)}{(Cy\delta l \cdot Cl\delta n - Cy\delta n \cdot Cn\delta l)} \right) +$$
$$\left( \frac{\Delta}{(Cl\delta l \cdot Cn\delta n - Cl\delta n \cdot Cn\delta l)} \right)$$

which can be written:

$$Cy = A.Cnf + B.\beta$$

with $$\begin{cases} A = \left( \dfrac{(Cy\delta l \cdot Cl\delta n - Cy\delta n \cdot Cl\delta l)}{(Cl\delta l \cdot Cn\delta n - Cl\delta n \cdot Cn\delta l)} \right) \\ B = \left( \dfrac{\Delta}{(Cl\delta l \cdot Cn\delta n - Cl\delta n \cdot Cl\delta n)} \right) \end{cases}$$

It will be recalled that by regression over the test points, said coefficients A and B can be obtained.

Secondly, the relationship R' is demonstrated.

In the known way, lateral equilibrium for the aircraft can be written:

$$\frac{1}{2} \cdot \rho o \cdot S \cdot Vc^2 (Cy\beta \cdot \beta + Cy\delta n \cdot \delta n + Cy\delta l \cdot \delta l) + m \cdot g \cdot Ny = 0 \qquad (b)$$

Expression (b) can also be written:

$$-Cy\beta \cdot \beta - Cy\delta n \cdot \delta n - Cy\delta l \cdot \delta l = \frac{m \cdot g \cdot Ny}{\frac{1}{2} \cdot \rho o \cdot S \cdot Vc^2} = -Cy \qquad (c)$$

Being close to equilibrium, we set $Cy\delta n.\delta n + Cy\delta l.\delta l = C$, and expression (c) can then be written:

(R2) $Cy\beta.\beta + C = Cy.$

By linear regression over the test points, the coefficients $Cy\beta$ and $C$ of this relationship R' can be obtained.

Thirdly, regarding relationship R1, it is known that the aforementioned relationship R' can also be written:

$$Cnf = \frac{\Delta Fn \cdot y}{\frac{1}{2} \cdot \rho o \cdot S \cdot L \cdot Vc^2} = \frac{1}{A} \cdot (Cy - B \cdot \beta) \qquad (d)$$

In order to deduce the aerodynamic capability from this, the certification conditions are imposed, namely:

(e) Nycertif=0.087=sin (Φ=5°)

$$mcertif \cdot g = \frac{1}{2} \cdot po \cdot S \cdot Czmax \cdot \frac{Vc^2}{KVs1g^2} \quad (f)$$

hence:

$$Cycertif = -\frac{Nycertif \cdot Czmax}{KVs1g^2} \quad (g)$$

Said expressions (d), (e) and (g) make it possible to determine the angle β corresponding to these certification conditions:

$$\beta certif = \frac{Cycertif - C \cdot KVs1g^2}{Cy\beta \cdot KVs1g^2} \quad (h)$$

And hence the aerodynamic capability [from expressions (d), (e), (f), (g) and (h)]:

$$\Delta Fn = \frac{\frac{1}{2} \cdot po \cdot S \cdot L \cdot Vc^2}{y \cdot A} \cdot (Cycertif - B \cdot \beta certif)$$

namely $$\Delta Fn = \frac{\frac{1}{2} \cdot po \cdot S \cdot L \cdot Vc^2}{y \cdot A} \cdot \left( Cycertif - B \cdot \frac{Cycertif - C \cdot KVs1g^2}{Cy\beta \cdot KVs1g^2} \right)$$

This then gives the relationship R1:

$$\Delta Fn = K.Vc^2$$

with $$\begin{cases} K = \dfrac{\frac{1}{2} \cdot po \cdot S \cdot L}{y \cdot A} \cdot \left( Cycertif - B \cdot \dfrac{Cycertif - C \cdot KVs1g^2}{Cy\beta \cdot KVs1g^2} \right) \\ \text{or} \\ K = \dfrac{po \cdot S \cdot L}{2 \cdot y} \cdot cnfcertif \end{cases}$$

What is claimed is:

1. A method for determining, on an aircraft equipped with a plurality of engines, a minimum control speed with at least one engine shut down, said method comprising the steps of:
   (a) measuring, during at least one flight of said aircraft, values of predefined parameters on said aircraft,
   (b) determining, on the basis of said measurements and at least one predefined certification value, a certification value (Cnfcertif) for a yaw moment (Cnf) created by a shutting down of said at least one engine;
   (c) calculating, on the basis of said certification value (Cnfcertif), a value of a parameter (K) to allow forming of a first relationship:

$$\Delta fn = K.Vc^2,$$

in which:
   Δfn illustrates a asymmetry of thrust due to the shutting down of the at least one engine; and
   Vc represents a speed of the aircraft; and
   (d) determining, on the basis of said first relationship and of engine thrust curves, said minimum control speed, wherein step (b) comprises:
      (i) deducing, on the basis of simultaneously measured values of, respectively, the sideslip (β) and the lateral force (Cy), a second relationship between said sideslip (β) and said lateral force (Cy) is deduced;
      (ii) determining, on the basis of said second relationship and a certification value (Cycertif) of said lateral force (Cy), a corresponding certification value (βcertif) for the sideslip (β);
      (iii) deducing, on the basis of the simultaneously measured values of, respectively, said sideslip (β), said lateral force (Cy) and said yaw moment (Cnf), a third relationship between said sideslip (β), said lateral force (Cy) and said yaw moment (Cnf); and
      (iv) determining said certification value (Cnfcertif) on the basis of said third relationship and said certification values (Cycertif) and (βcertif).

2. The method as claimed in claim 1, wherein said second relationship between the lateral force (Cy) and the sideslip (β) is:

$$Cy=Cy\beta.\beta+C,$$

in which Cyβ and C are coefficients determined in step (i) on the basis of said measurements made on the aircraft.

3. The method as claimed in claim 1, wherein said third relationship between the lateral force (Cy), the sideslip (β) and the yaw moment (Cnf) is:

$$Cy=A.Cnf+B.\beta,$$

in which A and B are coefficients determined in step (iii) on the basis of said measurements made on the aircraft.

4. The method as claimed in claim 1, wherein, in step (c), the parameter (K) is calculated from the relationship:

$$K = \frac{po \cdot S \cdot L}{2 \cdot y} \cdot Cnfcertif$$

in which:
   ρo is the density of air at 0 feet in standard atmosphere;
   S is the reference area of the wing structure of said aircraft;
   L is the mean aerodynamic chord of said aircraft; and
   y is the lever arm of the engine.

* * * * *